United States Patent [19]

Dickerson

[11] Patent Number: 4,780,880
[45] Date of Patent: Oct. 25, 1988

[54] CHEMICAL OXYGEN IODINE LASER

[75] Inventor: Robert A. Dickerson, Canoga Park, Calif.

[73] Assignee: Rockwell International Corporation, El Segundo, Calif.

[21] Appl. No.: 49,479

[22] Filed: May 14, 1987

[51] Int. Cl.$^4$ .......................... H01S 3/22; H01S 3/223
[52] U.S. Cl. .......................................... 372/60; 372/89
[58] Field of Search ....................... 372/55, 60, 89, 58, 372/70

[56] References Cited

U.S. PATENT DOCUMENTS

| | | | |
|---|---|---|---|
| 3,992,685 | 11/1976 | Ogren et al. | 372/89 |
| 4,267,526 | 5/1981 | McDermott et al. | 372/89 |
| 4,434,492 | 2/1984 | Benard et al. | 372/59 |
| 4,622,676 | 11/1986 | Benard | 372/58 |
| 4,653,062 | 3/1987 | Davis et al. | 372/89 |

OTHER PUBLICATIONS

D. J. Benard et al.; "Efficient Operation of A 100-W Transverse-Flow Oxygen-Iodine Chemical Laser"; Appl. Phys. Lett. 34 (1), 1 Jan. 1979; pp. 40-41.

Yoshimoto et al.; "A Highly Efficient, Compact Chemical Oxygen-Iodine Laser"; J. Appl. Phys. 59 (12), 15 Jun. 1986, pp. 3965-3967.

J. Bachar et al.; "An Efficient, Small Scale Chemical Oxygen-Iodine Laser"; Appl. Phys. Lett. 41 (1), Jul. 1982; pp. 16-18.

*Primary Examiner*—William L. Sikes
*Assistant Examiner*—B. Randolph
*Attorney, Agent, or Firm*—H. Fredrick Hamann; Harry B. Field; David C. Faulkner

[57] ABSTRACT

A method for enhancing the lasing action in a chemical oxygen iodine laser wherein a gas stream having a desired reactant gas concentration profile is combined with a diluent gas concentration profile using hydrogen as the diluent gas.

1 Claim, No Drawings

CHEMICAL OXYGEN IODINE LASER

BACKGROUND OF THE INVENTION

1. Field of the Invention

The present invention relates to chemical lasers and more particularly to chemical oxygen iodine lasers.

2. Background of the Invention

The chemical oxygen-iodine laser (COIL) produces radiation at a frequency of 1315 nm (IR radiation) from chemical fuel. The lasing action is accomplished by mixing an optically active lasing medium with an electronically excited energizing gas and then directing a flow of the resultant gaseous mixture into an optical laser cavity where the lasing action is generated. The lasing medium, including a diluent, and the electronically excited gas react chemically to provide the necessary population inversion and lifetime required to create the lasing action.

OBJECTS OF THE INVENTION

An object of the invention is to improve the performance of chemical oxygen iodine lasers.

Another object of the invention is to utilize a novel diluent which enhances the lasing reaction and from which the combusted products may be easily removed from the laser system.

SUMMARY OF THE INVENTION

The objects and advantages of the present invention are attained by utilizing as a diluent hydrogen ($H_2$) which enhances the laser efficiency and provides for larger pressure ratios in the laser nozzle.

DETAILED DESCRIPTION

In a representative chemical oxygen-iodine laser system such as disclosed and claimed in U.S. Pat. No. 4,622,676, incorporated herein by reference, a mixture of iodine, oxygen, fluorine and helium gases are injected into a closed-cycle laser system. By varying the amount and type of diluent added to gaseous mixture, the reaction temperature within the system may be adjusted to enhance performance thereof.

The active reactants are often diluted with a suitable inert gas such as helium, argon, and nitrogen. Detailed list of fuel, oxidizers and diluents for chemical lasers are given in "Handbook of Chemical Lasers", edited by R. W. S. Gross and J. F. Bott (Wylie, N.Y., 1976).

However, in the case of a chemical oxygen-iodine laser (COIL) it has been surprisingly realized that the utilization of hydrogen ($H_2$) as a diluent may be substituted for the above noted diluents. The lower molecular weight of hydrogen and higher heat capacity thereof improves the performance of the laser. When the hydrogen is used in stoichiometric proportions ($2H_2 + 1O_2$), an added advantage of a hydrogen diluent is realized in that the reactive gas combustion mixture can be exhausted to produce water which may be condensed out and frozen in a cold trap, thereby virtually eliminating the need for exhaust pumps and thereby simplifying the laser system.

Obviously, many modifications and variations of the present invention are possible in light of the above teachings.

What is claimed and desired to be secured by Letters Patent of the United States is:

1. In a method for converting infrared laser radiation to visible laser radiation comprising the steps of injecting a mixture of iodine, oxygen and fluorine gases into a laser cavity and passing infrared laser radiation having a wavelength of 1315 nm through the gases in said cavity to excite molecules therein and cause reactions among the molecules resulting in the production of excited iodine monofluoride molecules which release their excitation energy to produce visible laser radiation, wherein the improvement comprises:

diluting the reactive gases with hydrogen gas in stoichiometric proportions;

forming exhaust gases;

cooling said exhaust gases to form water vapor by condensation; and exhausting said condensed water vapor into a cold trap thereby eliminating exhaust pumps in the laser operation.

* * * * *